US008490361B2

United States Patent
Curry et al.

(10) Patent No.: US 8,490,361 B2
(45) Date of Patent: *Jul. 23, 2013

(54) MULTIPURPOSE PROTECTIVE GROUND COVER

(75) Inventors: Bob Curry, Torrance (CA); Ken Curry, Woodbridge (CA)

(73) Assignee: Covermaster Inc., Rexdale, Ontario (CA)

( * ) Notice: Subject to any disclaimer, the term of this patent is extended or adjusted under 35 U.S.C. 154(b) by 257 days.

This patent is subject to a terminal disclaimer.

(21) Appl. No.: 12/543,813

(22) Filed: Aug. 19, 2009

(65) Prior Publication Data

US 2009/0308002 A1   Dec. 17, 2009

Related U.S. Application Data

(63) Continuation of application No. 11/522,385, filed on Sep. 18, 2006, now Pat. No. 7,607,265.

(51) Int. Cl.
*E04B 2/00* (2006.01)
(52) U.S. Cl.
USPC ........ 52/592.4; 52/407.1; 52/591.1; 52/592.2
(58) Field of Classification Search
USPC .................. 52/177, 581, 591.1, 191.3, 592.1, 52/578, 506.1, 407.1, 403.1, 747.11, 302.3, 52/783.1, 588.1, 589.1, 790.1, 793.1, 793.11, 52/592.2, 592.4; D25/156
See application file for complete search history.

(56) References Cited

U.S. PATENT DOCUMENTS

| | | | |
|---|---|---|---|
| 1,263,755 A | 4/1918 | Gamble et al. | |
| 2,113,076 A | 4/1938 | Bruce | |
| 4,167,599 A | 9/1979 | Nissinen | |
| 4,436,779 A * | 3/1984 | Menconi et al. | 428/169 |
| D274,948 S | 7/1984 | Swanson et al. | |
| 4,584,221 A | 4/1986 | Kung | |
| 4,590,731 A | 5/1986 | DeGooyer | |
| 4,860,510 A * | 8/1989 | Kotler | 52/177 |
| 4,930,286 A | 6/1990 | Kotler | |
| D327,748 S | 7/1992 | Dorfman, Jr. | |
| 5,348,778 A | 9/1994 | Knipp | |
| 5,787,654 A | 8/1998 | Drost | |
| 5,822,944 A * | 10/1998 | Penland, Sr. | 52/591.1 |
| 5,833,386 A | 11/1998 | Rosan et al. | |
| 5,904,021 A * | 5/1999 | Fisher | 52/578 |
| 5,992,106 A | 11/1999 | Carling et al. | |
| 6,032,428 A | 3/2000 | Rosan et al. | |
| 6,061,979 A * | 5/2000 | Johannes | 52/177 |
| 6,098,354 A | 8/2000 | Skandis | |
| 6,544,624 B1 * | 4/2003 | Lopez-Anido et al. | 428/118 |
| 6,558,070 B1 | 5/2003 | Valtanen | |
| 6,612,508 B2 * | 9/2003 | Lambert | 239/533.12 |
| 6,662,508 B1 | 12/2003 | Else | |
| 7,607,265 B2 * | 10/2009 | Curry et al. | 52/181 |
| 8,205,407 B2 * | 6/2012 | Genova | 52/582.1 |

* cited by examiner

*Primary Examiner* — Joshua J Michener
*Assistant Examiner* — Chi Q Nguyen
(74) *Attorney, Agent, or Firm* — McMillan LLP

(57) ABSTRACT

A large-area protective covering system for installation in a staggered or grid configuration is provided comprised of a plurality of essentially identical large area panels with honeycomb internal structures which have locking systems on the sides and ends for locking the panels in place. The panels, once locked together have little movement along their x, y or z axis.

14 Claims, 4 Drawing Sheets

MULTIPURPOSE PROTECTIVE GROUND COVER

FIELD OF THE INVENTION

The present invention is directed to a product for the creation of temporary, protective surface covet, and the like, and in particular, to the protection of surfaces, such as ice in a hockey arena, artificial turf in a sports arena, and grass or other surfaces in indoor and outdoor venues.

BACKGROUND OF THE INVENTION

Covers for the protection of surfaces are commonly used to protect the ice surface in a hockey arena, for protection of artificial turf surfaces in indoor or outdoor stadiums, or to provide a modified surface other than, for example, concrete and the like, for both indoor and outdoor environments.

The prior art protective covering systems can include simple systems such as, for example, 4 by 8 foot sheets of plywood which are laid on the surface to be protected. A feature of this type of protective covering system is that it can be rapidly installed over a large surface, and thus allow for rapid conversion of, for example, the ice surface in a hockey arena, to allow for seating, for a concert or the like. The protective covering material can also be collected after use, stored, and reused in order to minimize costs. Further, the plywood sheets can be custom cut and saved to fit into areas of restrictive application, such as in the rounded corners of a hockey ice sheet.

However, use of simple plywood systems can lead to bending, shifting and buckling of the plywood, particularly if equipment, such as fork lifts or the like, are driven on the plywood surface. This can lead to the formation of small gaps between the plywood sheets which can cause tripping hazards, or which can trap the wheels of dollies or other equipment traveling over the protective covering surface. Use of tongue and groove plywood might overcome some of these problems, but this material would not be suitable for all applications since this system could not be rapidly or easily installed, and the tongue and groove feature could be easily damaged during routine installation or removal.

A further problem with this type of system is that it provides little if any significant insulation. This can be an important considerations if the protective surface is installed over an ice surface, or frozen wet ground where it would be desirable to provide a warmer floor temperature for those using the arena or site and provide for reduced cooling costs for maintaining the ice surface temperature under the protective covering.

Small-area systems are also known, having panels which are typically less than 0.5 m² in surface area. Because of their small size, installation of these systems can take considerable time. Accordingly, it is generally preferred to use "large-area" panels each of which has a surface area of at least 1 m².

In U.S. Pat. No. 3,870,587 (Merrell), an ice rink cover is described having an insulated core, a wooden frame, and a simple "hand holds" to facilitate lifting and movement of the panes. Staten el al., in U.S. Pat. No. 5,820,798 and related U.S. Pat. No. 5,983,584, describe an ice rink cover which is produced by combining two identical plastic panels to form a combined protective covering panel which has an internal support structure consisting of aligned pillars from the upper and lower panel surfaces.

Accordingly, while the prior art systems have adequate protective covering properties, it would be advantageous to provide a large-area protective panel which would provide improved protective covering properties, while facilitating installation and removal of the protective covering.

SUMMARY OF THE INVENTION

Accordingly, it is an advantage of the present invention to provide a large area protective covering which can be used on various surfaces, such as ice sheets, turf, grass, pavement and the like.

It is a further advantage of the present invention to provide a large area protective covering system which can be installed and removed rapidly.

It is a further advantage of the present invention to provide a large area protective covering system which resists the tendency to bend, buckle or separate.

The advantages set out hereinabove, as well as other objects and goals inherent thereto, are at least partially or fully provided by the large-area protective covering system of the present invention, as set out herein below.

Accordingly, in one aspect, the present invention provides a large-area protective covering system comprising: a plurality of large-area panels wherein each of the panels comprises: a flat upper surface, a grid-pattern internal structure preferably attached to the upper surface and an optional flat lower surface;
  a first side having a first, side locking system,
  a second side having a second, side locking system, for operative engagement with the first, side locking system of an adjacent panel;
  a first end having an first, end locking system;
  a second end having a second, end locking system, which is preferably for operative engagement with the first, end locking system of an adjacent panel;
  wherein the grid-pattern internal structure provides enhanced weight distribution and strength to the panels and locking systems on each of the panels are positioned as to permit adjacent panels to be locked together.

Preferably, the first and second side of the panel have a plurality of locking systems. Preferably each panel has at least 2 locking systems, more preferably between 2 and 5 locking systems, and most preferably, between 2 and 4 locking systems.

In a still further aspect, the present invention also provides a method for protecting a surface comprising installing a plurality of essentially identical large area panels each of which large-area panels are as hereinabove described. Preferably, however, the method for protecting a surface comprises installation of a plurality of essentially identical large area panels, each of which large area panels has an essentially flat upper surface; a grid-pattern internal structure and an optional essentially flat lower surface;
  a first side having a first, side locking systems;
  a second side having a second, side locking system;
  a first end having an first, end locking system; and
  a second end having a second, end locking system, wherein the installation comprises:
  a) placing a first panel on a surface to be protected;
  b) installing a second panel with the first, end locking system of one panel in operative contact with the second, end locking system of the second panel, and sliding the second panel until the ends of the two panels are in contiguous contact with each other and the sides of the panels are essentially in alignment with one another;
  c) repeating step b) as often as required to establish an end-to-end row of large area panels which are in end-to-end alignment with each other;

d) installing a further panel by placing the first, side locking system of the further panel in operative contact with the side locking system of the panels of the end-to-end row of large area panels, wherein the further panel is in side-to-side alignment with the end of any of the panels of the adjacent end-to-end row of large area panels;

e) installing an additional panel by repeating step d) and by placing the first, end locking system in operative contact with the second, end locking system of the further panel;

f) repeating step e) as often as required to establish a second end-to-end row of large area panels adjacent to the first end-to-end row of large area panels; and g) repeating steps d) to f) in order to establish a series of end-to-end rows of large area panels, wherein each of the rows is operatively connected an adjacent end-to-end row of large area panels.

DETAILED DESCRIPTION OF THE INVENTION

In the present application, the term "protective cover" refers to covering materials which are preferably used for covering and protecting a surface such as artificial turf, ice, concrete flooring, grass, or the like.

Further, the present application is primarily directed to the use of protective coverings. However, the skilled artisan will be aware that covering system of the present invention might also be used in a wide variety of applications. For example, the skilled artisan would be aware that the present application is equally applicable in other non-protective covering applications. As such, the protective covering may be used to minimize damage to the protected surface, or may simply be used to provide an alternative surface appearance or texture. For example, a softer plastic floor material or a panel covered with carpet material might be preferable to a concrete floor, even in situations where the concrete floor has little risk of being damaged.

With respect to the use of the panels, preferably, the edges (e.g. the sides and ends) of the panels, and/or the sides of the end-to-end rows of large area panels when installed as a complete protective covering, are in essentially contiguous contact with each other. As such, there are no significant gaps between panels, and the protective covering provides essentially complete coverage of the surface to be protected.

The term "large area" is used to describe panels having a surface area coverage of at least 1.0 $m^2$, more preferably greater than 1.75 $m^2$, and most preferably greater than 2.5 $m^2$. The panel can be any suitable shape including square, rectangular, or the like, provided that the sides and ends of the panels are adapted for contiguous alignment with adjacent panels, as described hereinbelow. A preferred size and shape for the large-area panels is a rectangle which measures about 4 ft. (1.2 m) by about 8 ft. (2.4 m). Another preferred size and shape is a rectangle which measures 5 ft. (1.5 m)×10 ft. 3.1 m).

In a typical installation, a number of panels would be used, and this number might exceed 50, 75 or even 100 panels which are essentially identical in size, shape and configuration. Having identical panels allows the user to easily replace any damaged standard panels, and facilitates installation since any standard panel could be placed anywhere in the protective covering. It should be noted, however, that special sized or shaped panels could be separately kept in order to address any specific installation issues, such as, for example, the rounded corners of an ice hockey rink.

It is a feature of the present invention that the panels may be installed in both a staggered configuration or as a grid pattern where the sides and the ends of the panels are both in alignment with adjacent panels. The staggered configuration includes staggering either at the sides, at the ends or both.

The upper surface of the panel is preferably made of a plastic material, but can be made of any suitable material having the strength properties necessary for the intended application. Preferably, the panel is made primarily of polyethylene, polypropylene or the like, or made be fabricated from recycled plastic material. Blends of these materials, or these types of materials, are also possible. The overall upper structure of the upper surface is preferably flat, but might contain some texturizing structures for appearance or for functionality, such as to reduce the slipperiness of a smooth plastic panel. The upper surface might also be covered by additional material, such as, for example, carpeting, vinyl or wood veneers, or the like, to give the panel a desired appearance when installed.

The optional lower surface of the panel is also preferably made of plastic, and preferably is made of the same material as the upper surface. However, additional support materials might be added to the lower surface of the panel in order to strengthen the sides or ends of the panels. These support materials might also be made of plastic, but can be made of a ferrous or non-ferrous metal such as steel or aluminum. The lower surface is also preferably essentially flat so as to rest completely flat on the surface to be protected.

The panel also comprises an internal structure, preferably attached to the upper surface and separating it from the optional lower surface, when present. Preferably, this internal structure comprises a "honeycomb" structure of, for example, 5 to 10 cm squares, with a depth of 2 to 5 cm. Rather than squares, the pattern could be made up of circles, triangles, pentagons, hexagons or other shapes, or a mixture thereof, that serve to increase the weight bearing capabilities of the upper surface, distribute the weight of any load that might be applied to the panels and increases the structural strength of the panels. Any such pattern is herein defined as a grid-pattern. The internal structure is also preferably made of plastic, and preferably made of the same plastic as the upper or lower surface. In one embodiment, the internal structure can be formed as part of, and in combination with, the lower, or more preferably, with the upper surface.

The internal structure preferably has grid-pattern in order to provide the necessary support between the upper and optional lower surface, while still reducing the overall weight of the panel. Further, the gap within each honeycomb of the grid-pattern can be filled with insulating material in order that the panel will have some insulating properties. Preferably, the panel contains sufficient insulation to provide an insulation "R-factor" of more than 1, preferably more than 2, and most preferably, more than 4. The insulation might be a foamed material such as polyurethane which is foamed in place in the honeycomb structure, or might be a solid or rigid Styrofoam™ type material which is pressed into place within the honeycomb. Such an insulated internal structure is particularly beneficial for ice surface or frozen ground/turf applications.

The insulative ability of the panel will be dependent, inter alia, oil the type of insulation chosen, and the depth of the honeycomb structure.

The locking system on each side and end of the panels is preferably a locking mechanism which can act as a slidable locking mechanism, and preferably comprises a system where each panel has a groove and a projection which corresponds with, and operatively engages a corresponding projection and groove, respectively, on an adjacent panel.

For ease of reference, the side of the panels are orientated in the "x" axis, by definition. The ends of the panel are orientated in the "y" axis. Up or down movement of the panels, would therefore be in the "z" axis.

By providing a slidable locking mechanism, the ends of the panels can be temporary connected, and the panel then slid into end-to-end alignment by sliding one panel with respect to the other. Once the ends are connected, one panel can be moved in the y axis with respect to the other. Once the sides of the panels are jointed, the panels are restricted in their x, y or z movement, provided that the panels are kept flat (e.g. not tilted).

Accordingly, through the use of the locking system, a protective covering system is provided wherein movement of any of the panels in the x, y or z axis is made difficult. As such, each panel is locked into place, and any tendency of the system for bend, buckle or separate, is reduced.

BRIEF DESCRIPTION OF THE DRAWINGS

An embodiment of this invention will now be described by way of example only in association with the accompanying drawings in which.

DETAILED DESCRIPTION OF THE PREFERRED EMBODIMENTS

Figure 1:
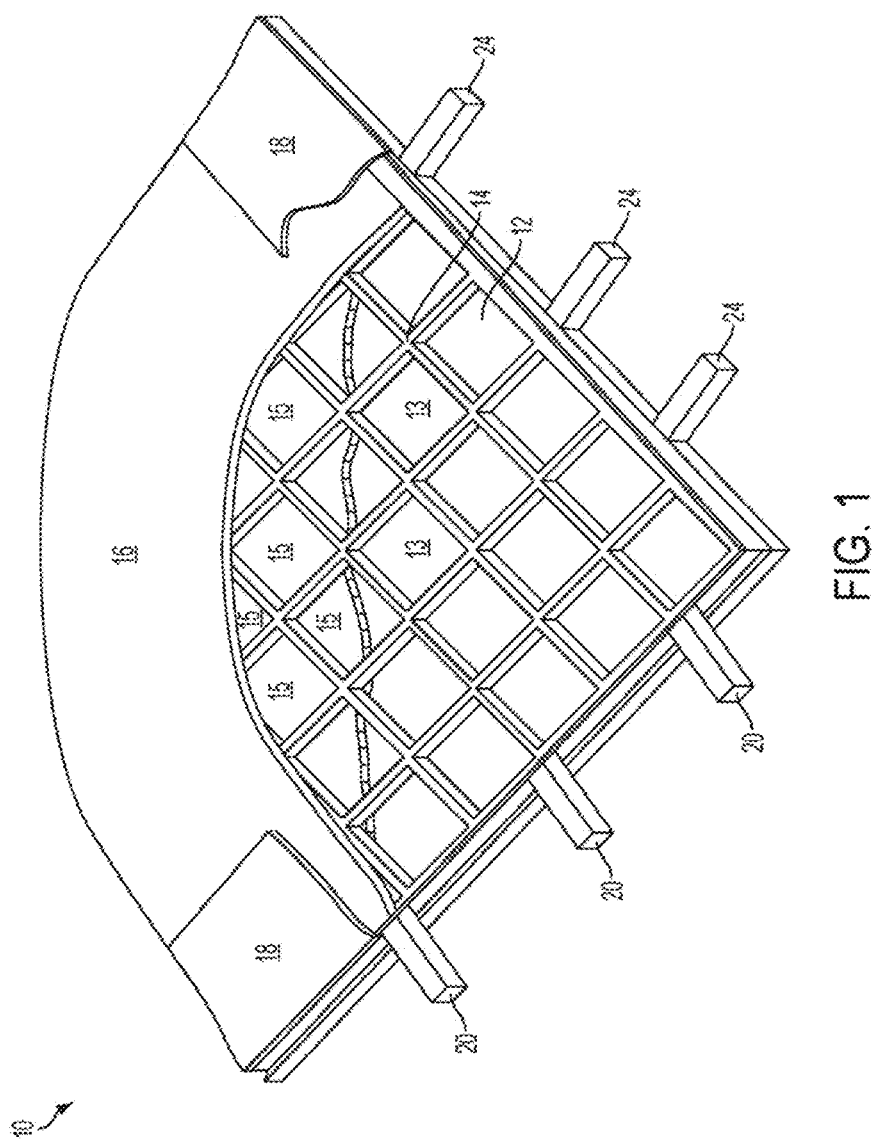
FIG. 1 is a perspective, cut-away view of one corner of a large area panel in accordance with the present invention disclosing the optional lower surface and internal structure.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood however, that the drawings are for the purpose of illustration and description only and are not intended as a definition of the limits of the invention.

Referring to FIG. 1, the underneath or lower surface section of one corner of a large area panel 10 of the present invention is shown wherein part of the panel has been cut away to show details of construction. Panel 10 has a plastic top surface 12, a honeycomb of plastic material as an internal structure 14, a lower plastic surface 16, and aluminum reinforcement braces 18. Also, panel 10 has end, locking systems 20 and side, locking systems 24.

Top surface 12 is seen only through the holes 13 in internal structure 14 at the lower edge of panel 10 (as drawn), and top surface 12 and internal structure 14 are formed together as one piece as part of a plastic injection moulding operation. All plastic parts in panel 10 are formed from plastic combined with polyethylene to provide adequate strength.

During construction of panel 10, all of the holes 13 of panel 10 are filled with Styrofoam™ type rigid insulating material 15. As such, insulating material 15 is flush with the edge surface of internal structure 14.

Lower surface 16 is placed over the internal structure to effectively seal panel 10. Aluminum braces 18 are placed along the lower edges of panel 10 in order to provide additional support for the edges of panel 10.

Figure 2:
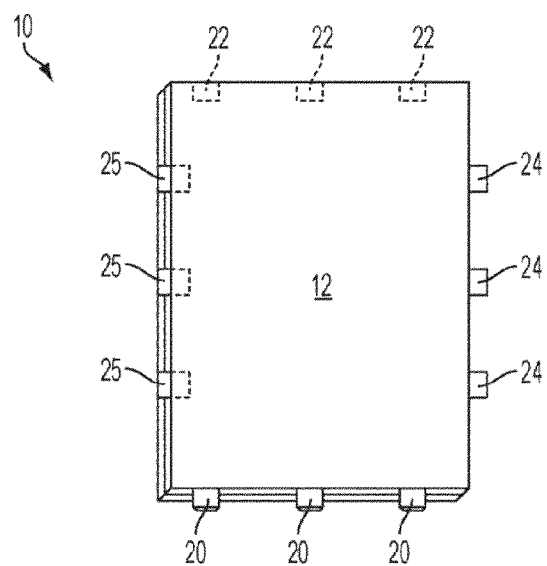
FIG. 2 is a rear view of a complete panel.
Figure 3:
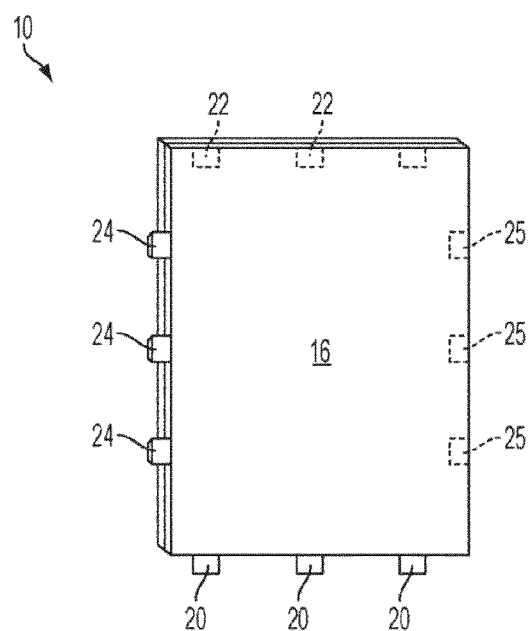
FIG. 3 is a top view of a complete panel.

The side and end locking systems are better seen in FIGS. 2 and 3 which show the top (or front) surface 12 of panel 10, in FIG. 2, and the lower (or rear) surface 16 of panel 10, in FIG. 3.

In FIG. 2, the top surface 12 of panel 10 is shown. End, locking system 20 is designed to engage corresponding end, locking system 22. FIG. 3 shows the lower surface 16.

Figure 4:
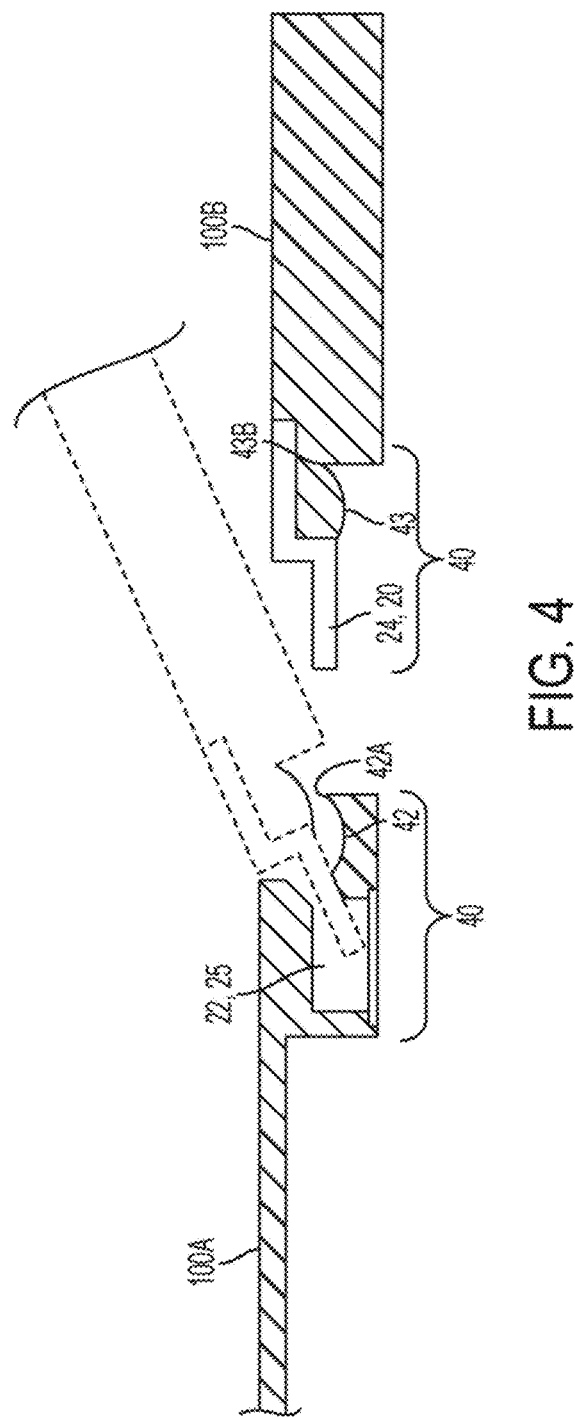
FIG. 4 is a side view of a locking system.

In FIG. 4, details of the locking systems 20, 22 and 24, 25 are shown wherein the grooves 42 and a projection 43 in a series of panels 100A and 100B are shown with a rounded "U-shaped" configuration. Other configurations are possible.

Panels 100A and 100B, which are identical in construction to each other, are shown separate from one another. Panel 100B is also shown, in dashed lines, in alignment for locking in place with panel 100A. To lock panels 100A and 100B together, panel 100B is raised to an approximate angle of 45° to panel 100A. The locking systems 20, 22 or 24, 25 are engaged with each other. Panel 100B is then lowered to the surface to be protected and projection 43 will seat into groove 42. As part of the U-shaped groove and projection, projection 42A of panel 100A will be inserted into "groove" 43B of panel 100B.

Once the locking mechanisms shown in FIG. 4 are put in place, movement of the two panels in the x, y or straight up in the z axis is not possible. To disengage the panels, one edge of panel 100B must be raised to establish the 45° angle, and locking systems 20, 22 or 24, 25 disengaged.

Figure 5:
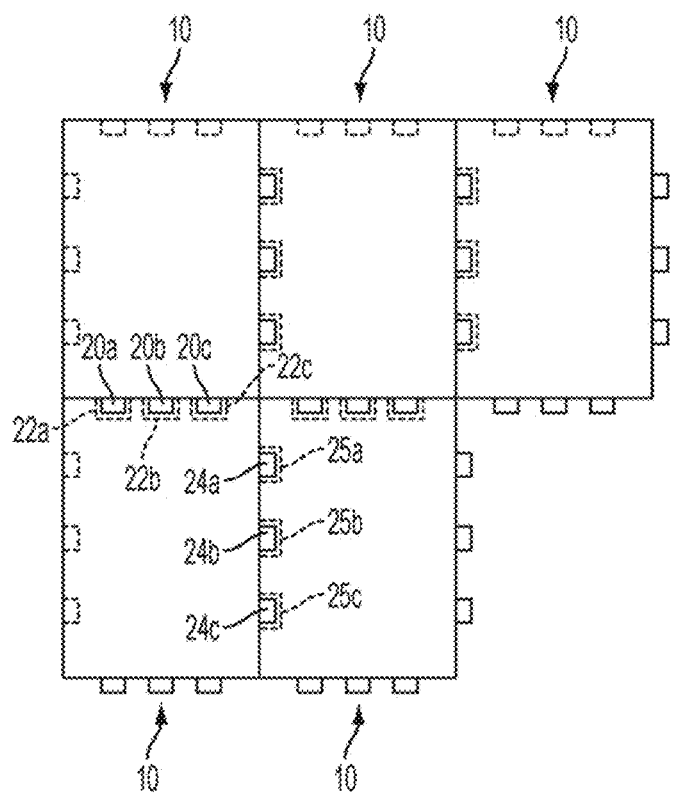
FIG. 5 is a top view of a protective covering system fabricated in a grid pattern using a plurality of panels.

FIG. 5 shows panels 10 with locking systems 20, 22 *a-c* and 24, 25 *a-c* operatively engaged with each other. A staggered arrangement could be achieved by engaging 20 *b* with 22*a* and 20*c* with 22*b*, etc. or 24*a* with 25*b* and 24*b* with 25*c*, etc. Various staggered configurations are possible depending on the number and location of the locking systems.

Thus, it is apparent that there has been provided, in accordance with the present invention, a protective covering system which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Further, while this discussion has addressed prior art known to the inventor, it is not an admission that all art discussed is citable against the present application.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Moreover, use of the terms "he", "him", or "his" is not intended to be specifically directed to persons of the masculine gender, and could easily be read as "she", "her", or "hers", respectively.

We claim:

1. A large-area protective surface covering system comprising
a plurality of panels, wherein each of the panels comprises:
an upper surface,
a lower surface spaced from said upper surface, a grid-pattern internal structure between said upper surface and said lower surface, said grid pattern internal structure positioned entirely between a flat portion of said upper surface and a flat portion of said lower surface, said upper surface and said lower surface entirely enclosing said grid pattern internal structure therebetween;

a first side having a first, side locking system, a second side having a second, side locking system, for operative engagement with the first, side locking system of an adjacent panel, a first end having a first end locking system, a second end having a second end locking system, for operative engagement with the second end locking system of an adjacent panel; and, wherein said grid-pattern internal structure provides enhanced weight distribution and strength to the panels and the locking systems on each of the panels are positioned as to permit adjacent panels to be locked together; and wherein the locking system comprises a u-shaped projecting member and a receiving member which are adapted for operative engagement with said receiving member and said u-shaped projecting member from an adjacent panel, respectively.

2. The large-area protective surface covering system according to claim 1, further comprising one or more braces along an edge of said lower surface to provide additional support for said edge of said panel.

3. The large-area protective surface covering system according to claim 2, wherein the side locking system and the end locking system comprise slidable locking mechanisms.

4. The large-area protective surface covering system according to claim 3, wherein the sides and ends of the panels are in essentially contiguous contact with each other.

5. The large-area protective surface covering system according to claim 4, wherein each of the panels covers a surface area of at least 1.0 m$^2$.

6. The large-area protective surface covering system according to claim 5, wherein each of the panels covers a surface area of at least 1.75 m$^2$.

7. The large-area protective surface covering system according to claim 6, wherein each of the panels covers a surface area of at least 2.5 m$^2$.

8. The large-area protective surface covering system according to claim 1, wherein the large area panels are installed in a grid configuration.

9. The large-area protective surface covering system according to claim 1, wherein the large area panels are installed in a staggered configuration.

10. The large-area protective surface covering system according to claim 1, wherein each panel is constructed of polyethylene, polypropylene, recycled or virgin plastic material, or combinations thereof and there between.

11. A protective surface cover panel comprising:

an upper surface, a lower surface spaced from said upper surface, a grid-pattern internal structure between said upper surface and said lower surface, said grid pattern internal structure positioned entirely between a flat portion of said upper surface and a flat portion of said lower surface, said upper surface and said lower surface entirely enclosing said grid pattern internal structure therebetween;

a first side having a first, side locking system, a second side having a second, side locking system, for operative engagement with the first, side locking system of an adjacent panel, a first end having a first end locking system, a second end having a second end locking system, for operative engagement with the second end locking system of an adjacent panel; and, wherein said grid-pattern internal structure provides enhanced weight distribution and strength to the panels and the locking systems on each of the panels are positioned as to permit adjacent panels to be locked together; and, wherein the locking system comprises a u-shaped projecting member and a receiving member which are adapted for operative engagement with said receiving member and said u-shaped projecting member from an adjacent panel, respectively.

12. The protective surface cover panel according to claim 11, further comprising one or more braces along an edge of said lower surface to provide additional support for said edge of said panel.

13. The protective surface cover panel according to claim 12, wherein the side locking system and the end locking system comprising slidable locking mechanisms.

14. The protective surface cover panel according to claim 11, wherein the panel is constructed of polyethylene, polypropylene, recycled or virgin plastic material, or combinations thereof and there between.

* * * * *